US011322021B2

(12) United States Patent
Royal

(10) Patent No.: US 11,322,021 B2
(45) Date of Patent: May 3, 2022

(54) SYSTEM AND APPARATUS FOR WIRELESS CONTROL AND COORDINATION OF TRAFFIC LIGHTS

(71) Applicant: Traffic Synergies, LLC, Jacksonville, FL (US)

(72) Inventor: Richard Wayne Royal, Green Cove Springs, FL (US)

( * ) Notice: Subject to any disclaimer, the term of this patent is extended or adjusted under 35 U.S.C. 154(b) by 130 days.

(21) Appl. No.: 17/013,762

(22) Filed: Sep. 7, 2020

(65) Prior Publication Data

US 2020/0410854 A1    Dec. 31, 2020

Related U.S. Application Data

(63) Continuation-in-part of application No. 16/235,004, filed on Dec. 28, 2018, now Pat. No. 10,769,943.

(60) Provisional application No. 62/611,582, filed on Dec. 29, 2017.

(51) Int. Cl.
| | |
|---|---|
| *G08G 1/081* | (2006.01) |
| *G08G 1/09* | (2006.01) |
| *G06K 9/62* | (2022.01) |
| *G08G 1/04* | (2006.01) |
| *G06V 20/54* | (2022.01) |

(52) U.S. Cl.
CPC .......... *G08G 1/081* (2013.01); *G06K 9/6257* (2013.01); *G06V 20/54* (2022.01); *G08G 1/04* (2013.01); *G08G 1/093* (2013.01)

(58) Field of Classification Search
None
See application file for complete search history.

(56) References Cited

U.S. PATENT DOCUMENTS

| | | | |
|---|---|---|---|
| 4,462,031 A | 7/1984 | Johnson | |
| 5,822,711 A | 10/1998 | Ochoa-Chavez | |
| 6,281,808 B1 * | 8/2001 | Glier | G08G 1/164 |
| | | | 340/916 |
| 7,821,422 B2 * | 10/2010 | Hutchison | G01S 13/92 |
| | | | 348/149 |
| 8,050,854 B1 * | 11/2011 | Chandra | G08G 1/07 |
| | | | 701/119 |
| 8,922,392 B1 | 12/2014 | Chandra et al. | |
| 9,607,402 B1 * | 3/2017 | Whiting | G08G 1/0116 |
| 9,759,812 B2 * | 9/2017 | Nichols | G08G 1/096741 |
| 10,147,316 B2 * | 12/2018 | Radomy | G08G 1/07 |

(Continued)

FOREIGN PATENT DOCUMENTS

KR    20110063819 A  *  6/2011  .............. H04W 4/20

*Primary Examiner* — Fekadeselassie Girma
(74) *Attorney, Agent, or Firm* — Wilson Dutra, PLLC; Camille A. Wilson

(57) ABSTRACT

The present disclosure provides an apparatus and system that may allow a user to facilitate the flow of traffic over contained environments or otherwise. This apparatus and system may improve management for the flow of traffic by providing a lower barrier for entry for municipalities and other entities to collaborate on traffic management. In some embodiments, those in control may create a tiered system for a series of lights within a connected block. In some implementations, those in control may create a tiered system over a larger grid system, such as an entire neighborhood, district, city, or state. In some aspects, the apparatus and system may allow those in control to set priorities for how to handle developing traffic conditions.

15 Claims, 10 Drawing Sheets

(56) References Cited

U.S. PATENT DOCUMENTS

| | | | |
|---|---|---|---|
| 10,769,943 B2* | 9/2020 | Royal | G08G 1/081 |
| 10,937,312 B2* | 3/2021 | Li | G08G 1/096783 |
| 10,937,313 B2* | 3/2021 | Ma | G08G 1/096775 |
| 11,107,347 B2* | 8/2021 | Malkes | G08G 1/0145 |
| 11,270,580 * | 3/2022 | Yamazaki | G08G 1/095 |
| 2008/0094250 A1* | 4/2008 | Myr | G08G 1/081 |
| | | | 340/909 |
| 2014/0195138 A1* | 7/2014 | Stelzig | G08G 1/0116 |
| | | | 701/119 |
| 2015/0170498 A1* | 6/2015 | Beggs | B60Q 1/2673 |
| | | | 340/686.6 |
| 2015/0243165 A1* | 8/2015 | Elsheemy | G08G 1/096775 |
| | | | 340/906 |
| 2016/0027300 A1* | 1/2016 | Raamot | G08G 1/0145 |
| | | | 340/922 |
| 2016/0097849 A1* | 4/2016 | Nichols | G08G 1/0175 |
| | | | 342/107 |
| 2017/0085632 A1* | 3/2017 | Cardote | H04L 67/02 |
| 2017/0270785 A1* | 9/2017 | Umehara | G08G 1/08 |
| 2017/0352263 A1* | 12/2017 | Umehara | G08G 1/0112 |
| 2019/0206247 A1* | 7/2019 | Xie | G06N 5/046 |
| 2020/0193819 A1* | 6/2020 | Ma | G08G 1/0112 |
| 2021/0407271 A1* | 12/2021 | Dubey | G08B 21/02 |

* cited by examiner

SYSTEM AND APPARATUS FOR WIRELESS CONTROL AND COORDINATION OF TRAFFIC LIGHTS

CROSS-REFERENCE TO RELATED APPLICATION

The present application is a Continuation in Part of U.S. Non-Provisional patent application Ser. No. 16/235,004 (titled "SYSTEM AND APPARATUS FOR WIRELESS CONTROL AND COORDINATION OF TRAFFIC LIGHTS" filed on Dec. 28, 2018), which claimed priority to U.S. Provisional Patent Application No. 62/611,582, filed Dec. 29, 2017, and titled "SYSTEM AND APPARATUS FOR WIRELESS CONTROL AND COORDINATION OF TRAFFIC LIGHTS", both applications are incorporated herein by reference.

BACKGROUND OF THE DISCLOSURE

The average United States commuter spends approximately 42 hours in traffic per year. In 2016, this averaged to about $1,400 per driver in gasoline expenses. These amounts may vary widely depending on the city, with more heavily populated cities commuters spending even more time and money due to frequent stop-and-go traffic. For example, commuters in Miami, Fla. averaged 65 hours in traffic and a cost of about $1,800 per driver while commuters in Los Angeles, Calif. averaged 104 hours in traffic and about $2,400 per driver. Though traffic accidents play into the transit times in larger cities, in smaller cities and towns traffic controls typically dictate the flow of traffic.

Traditionally, traffic control signals incorporated different types of technologies that may detect cars, such as timers, lasers, rubber hoses filled with air, and an inductive loop. With such a wide range of technology available to regulate traffic, some lights do not have any sort of traffic detection. In large cities, traffic lights may operate on timers. In suburbs and country roads, traffic detectors may be common. Detectors may trigger when a car arrives at an intersection, when too many cars are at an intersection, or when cars have entered a turn lane, so that the detector may activate the arrow light.

The most common form of traffic control is an inductive loop. The inductive loop is a coil of wire embedded in a road's surface. Vehicle presence is detected through electromagnetic induction, where a vehicle triggers the inductive loop to signal the traffic controller that there is traffic waiting at the intersection. Typically, the inductive loop is triggered just before the stop bar in a traffic lane, which is the thick white line painted on the pavement that signals to motorists where they should stop so that the traffic controller may detect effectively.

Traffic sensors associated with preemption systems are programmed to only detect certain infra-red signals from emergency vehicles and cannot be deceived by activating a green light for passenger vehicles.

Currently, most traffic lights are poorly timed and inefficient because transportation agencies do not have the personnel or financial resources to update these systems or to implement newer traffic technologies that could reduce delay at intersections. Without experienced personnel or money for updates and improvements, cities and rural areas are unable to improve the efficiency of their traffic control systems and motorists, and by default, people waste time, fuel, and, ultimately, money, due to traffic mismanagement.

SUMMARY OF THE DISCLOSURE

What is needed is an apparatus and system that may allow a user to facilitate the flow of traffic over contained environments or otherwise. This apparatus and system may improve management for the flow of traffic by providing a lower barrier for entry for municipalities and other entities to collaborate on traffic management. In some embodiments, those in control may create a tiered system for a series of lights within a connected block. In some implementations, those in control may create a tiered system over a larger grid system, such as an entire neighborhood, district, city, or state. In some aspects, the apparatus and system may allow those in control to set priorities for how to handle developing traffic conditions.

Generally the present disclosure relates to a traffic light system for managing traffic flow, wherein a first light may include: a first traffic light, a first wireless communication mechanism, a first wired communication mechanism, and a first precision timing mechanism, where the first light is located at a first intersection within a predefined geography, where timing associated with the first light is based on a first set of predefined parameters; a second light may include: a second traffic light, a second wireless communication mechanism, a second wired communication mechanism, and a second precision timing mechanism, where the second light is located at a second intersection within the predefined geography, where timing associated with the second light is based on a second set of predefined parameters; a first wireless set of setting priorities that prioritizes the first set of predefined parameters and the second set of predefined parameters, where the first set of setting priorities determine a first order of priority of responsiveness between the first light and the second light, and where the first set of setting priorities are communicated wirelessly to the first wireless communication mechanism and the second wireless communication mechanism; and a first wired set of setting priorities prioritizes the first set of predefined parameters and the second set of predefined parameters, where the first wired set of setting priorities determine a second order of priority of responsiveness between the first light and the second light, and where the first wired set of setting priorities controls the first light if the first wireless communication mechanism fails and the first wired set of setting priorities controls the second light if the second wireless communication mechanism fails.

Implementations may include one or more of the following features. The system may comprise a second wireless set of setting priorities that prioritizes the first set of predefined parameters and the second set of predefined parameters, where the second wireless set of setting priorities override the first wireless set of setting priorities when the second wireless set of setting priorities is initiated. The second wireless set of setting priorities may be customizable when initiated. The second wireless set of setting priorities may be temporary. The first wired set of setting priorities may control when either the first wireless communication mechanism fails or the second wireless communication mechanism fails. The traffic light system may revert back to the first wireless set of setting priorities when one or both the first wireless communication mechanism or the second wireless communication mechanism is available.

In some embodiments, a traffic light system for managing traffic flow may comprise a plurality of lights, each may comprise: a traffic light, a wireless communication mechanism, a wired communication mechanism, and a precision timing mechanism, where the plurality of lights are located at a plurality of intersections within a predefined geography, where timing associated with each light is based on a set of predefined parameters. The system may comprise a first wireless set of setting priorities that prioritizes the set of predefined parameters through wireless communication with at least a portion of the wireless communication mechanisms. The system may comprise a first wired set of setting priorities that prioritizes the set of predefined parameters through wired communication with at least a portion of the wired communication mechanisms, where the first wired set of setting priorities controls when there is a loss in communication with at least a portion of the wireless communication mechanisms.

Implementations may include one or more of the following features. The traffic light system may include a temporary wireless set of setting priorities that may override the first wireless set of setting priorities. The temporary wireless set of setting priorities is customizable. Customization may be received through wireless communication with a wireless device within a predefined range of the traffic light system. The temporary wireless set of setting priorities may control a portion of the plurality of lights, and where the first wireless set of setting priorities may control a remaining portion of the plurality of lights. At least a portion of the plurality of lights further may include a camera that collects periodic imagery of at least a portion of the plurality of intersections.

Periodic imagery may be analyzed for changes in traffic patterns associated with at least the portion of the plurality of intersections. Analysis may occur in real time, and changes may prompt initiation of the temporary wireless set of setting priorities, where the temporary wireless set of setting priorities may be based at least in part on the changes. The periodic imagery may be collected to build a set of training data for development of a dynamic algorithm based on analysis of the set of training data, where the dynamic algorithm may be configured to update one or both the first wireless set of setting priorities and the first wired set of setting priorities, where updates may be based on analysis.

In some embodiments, a method for managing traffic flow may comprise establishing communication with a plurality of lights, where each of the plurality of lights may include: a traffic light, a wireless communication mechanism, a wired communication mechanism, and a precision timing mechanism, where the plurality of lights may be located at a plurality of intersections within a predefined geography, where timing associated with each light may be based on a set of predefined parameters. The method may include transmitting a first set of setting priorities to at least a first portion of wireless communication mechanisms that prioritize the set of predefined parameters. The method may comprise transmitting a second set of setting priorities to at least a second portion of wired communication mechanisms that prioritize the set of predefined parameters. The method may comprise transmitting a set of conditions that determine when the first set of setting priorities controls and when the second set of setting priorities controls.

Implementations may comprise one or more of the following features. The method may comprise receiving a temporary set of setting priorities and transmitting the temporary set of setting priorities, where the temporary set of setting priorities may temporarily override the first set of setting priorities and the second set of setting priorities. The method may comprise receiving traffic data about at least a portion of the plurality of intersections, and updating one or more the first set of setting priorities, the second set of setting priorities, and the set of conditions based on the traffic data. In some aspects, updating may occur in real time. In some embodiments, at least a portion of traffic data may include image data.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, cause the apparatus to perform the actions. In some aspects, a system may comprise corresponding computer systems, apparatus, and computer programs recorded on one or more computer storage devices, each configured to perform the actions of the methods. Implementations of the described techniques may include hardware, a method or process, or computer software on a computer-accessible medium.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

Figure 1:
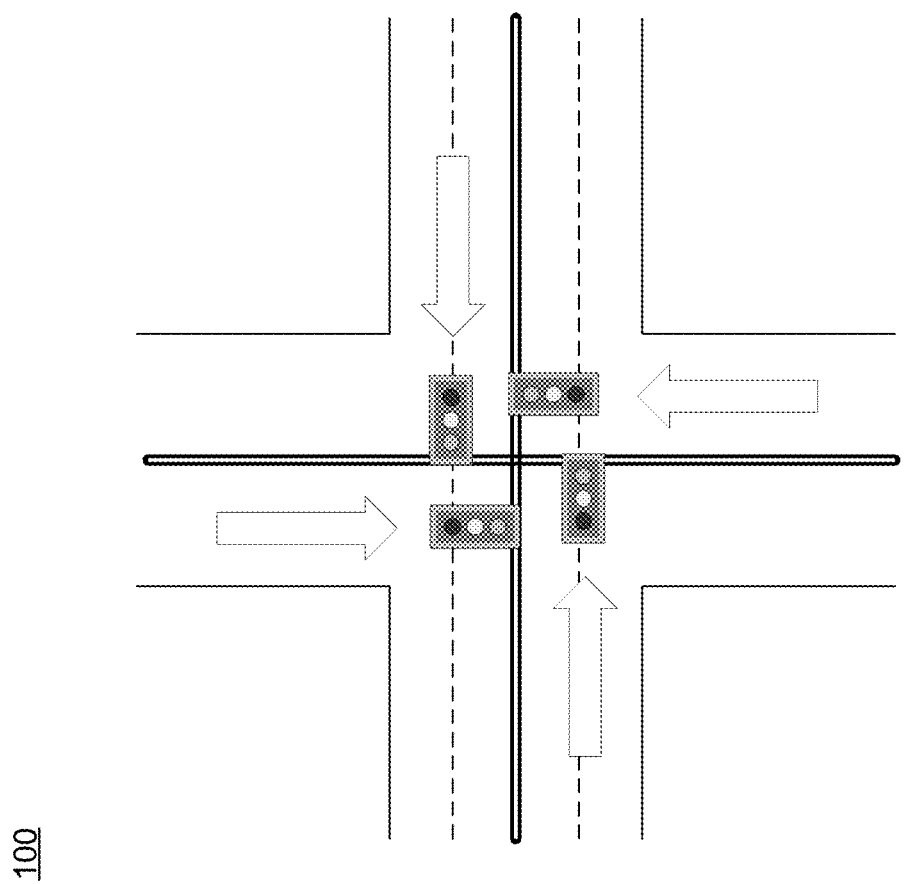
FIG. 1 illustrates an intersection with an exemplary traffic light system, according to some embodiments of the present disclosure

The present disclosure provides generally for an improved system for managing the flow of traffic. More specifically, the present disclosure relates to a traffic light system that more effectively and efficiently manages traffic flow and traffic light synchronization.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Traffic Light: as used herein refers to any light device that may be used to control the flow of traffic.

Light: as used herein refers to any traffic light that may be integrated into a traffic management system, wherein each light comprises a precision-timing mechanism. In some implementations, a system may comprise multiple lights, wherein the lights may operate in response to each other, independently from each other, or both. As an example of response, lights at a primary road may trigger a response from other lights at nearby secondary roads. As an example for independent lights, for lights within a predefined geographic, the precision-timing mechanisms may be programmed with a default timing pattern that creates a precisely timed series, such as based on speed limit and distance between lights. In some embodiments, a light may be manually controlled, set, or overridden. In some aspects, changes to setting or timing of a light may affect other lights.

Setting Priorities: as used herein refers to priorities of lights within a predefined geographic region, wherein the setting priorities may control the order of responsiveness to action conditions of lights within a predefined geographic region. In some aspects, setting priorities may identify overriding action conditions, which may change priorities of lights within a predefined geographic region. For example, traffic associated with a light at a busy intersection may be prioritized over other lights but may be lower priority than the presence of an emergency vehicle, which may trigger a temporary change in priorities. In some embodiments, setting priorities may determine hierarchy of response of lights within a predefined geographic region.

Action Conditions: as used herein refers to external conditions that may trigger a system response in one or more lights. In some implementations, action conditions may involve traffic associated with a particular intersection. In some embodiments, an action condition may occur nearby that may affect the flow of traffic. For example, an action condition may comprise the presence of an emergency vehicle.

Precision Timing Mechanism: as used herein refers to a timer that may be installed on a traffic light, wherein timing data may allow for one or both precise synchronization between traffic lights and accurate synchronization with traffic patterns. In some aspects, a precision timing mechanism may comprise a local timer, such as an atomic clock. In some embodiments, a precision timing mechanism may comprise a receiver with access to an offsite clock, such as a satellite clock.

Referring now to FIG. 1, an intersection 100 with an exemplary traffic light system is illustrated. In some aspects, an intersection 100 may comprise two intersecting streets with four traffic lights, wherein a traffic light may govern each direction for each street. In some embodiments, traffic flow from one direction may generally be more substantial than another direction, such as where one direction originates from a small neighborhood and the opposite direction originates from a busy highway.

In some aspects, the traffic flow for an intersection 100 may vary, such as by date, time, event, or day of the week. For example, traffic flow may increase during rush hour and decrease on weekends. In some implementations, the traffic flow may vary between the different directions during different times. For example, one direction may be congested during the morning rush hour, and the opposite direction may be congested during the evening rush hour.

Figure 2:
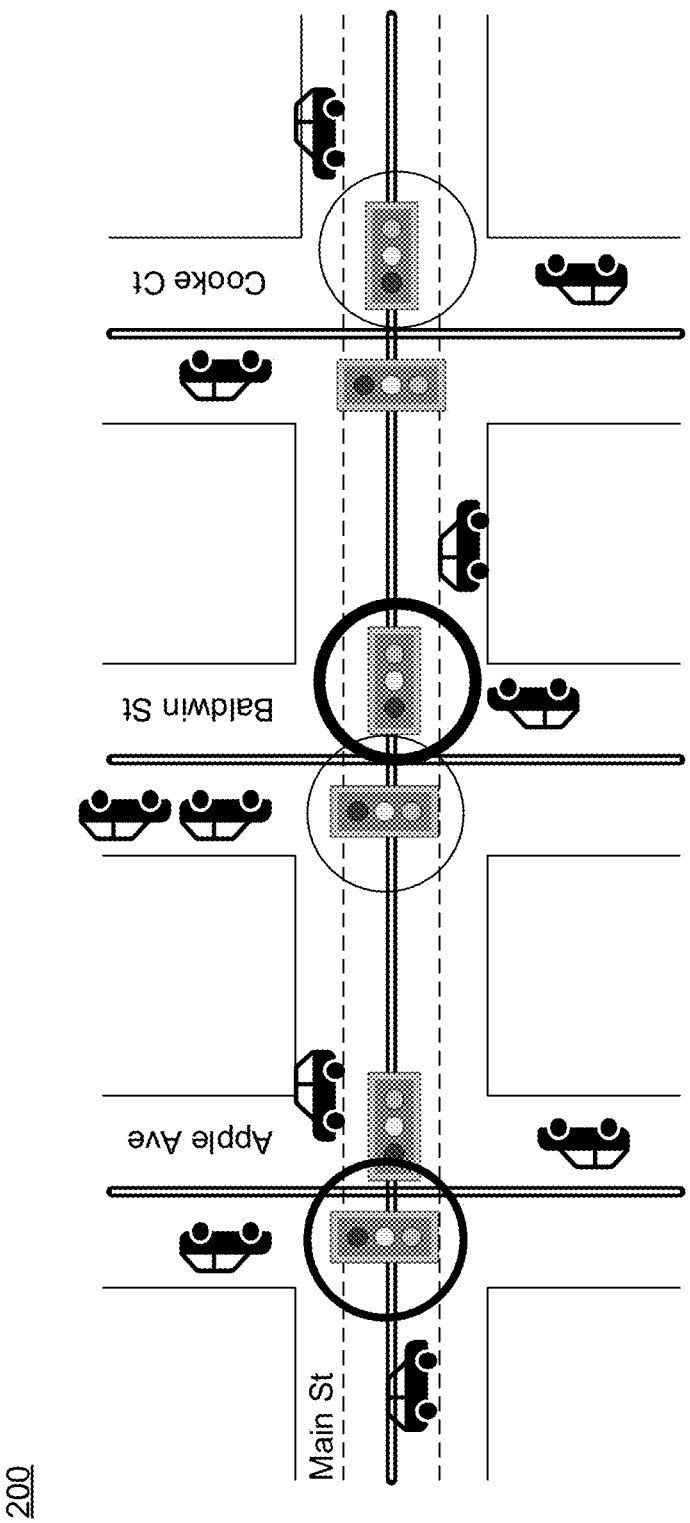
FIG. 2 illustrates an exemplary traffic light system, according to some embodiments of the present disclosure.

Referring now to FIG. 2, an exemplary traffic light system 200 is illustrated. In some aspects, a synchronization device may removably integrate with an existing traffic light system, wherein the device may allow for advanced synchronization and traffic light management. The device may comprise a precision timing mechanism that is configured for accurate and precise timing and control.

In some aspects, the device may comprise a processor logically connectable to one or more traffic lights, wherein the processor is configured to identify lights within the geographic area and impose settings priorities. In some embodiments, the device may be integrated with a new traffic light system. In some implementations, traffic lights may be equipped with sensors, such as to monitor traffic flow, proximity of emergency vehicles, or other action conditions, as non-limiting examples. In some aspects, the processor may be logically connectable to external controls, such as through wireless connection, direct line connection, or near field communication, as non-limiting examples.

In some embodiments, a traffic light may permanently be designated as a high priority light, such as at Main Street and Apple Avenue, wherein other lights within the predefined geographic area may be reactive to the high priority light. In some aspects, a high priority light designation may be temporary, such as during rush hour, major events, weekends, or when school ends, as non-limiting example. A temporary designation may allow for a dynamic management of a traffic light system. In some aspects, a primary light may generally have the highest priority, such as at Main Street and Apple Avenue, and a secondary light may periodically be shifted to a higher priority, such as at Baldwin Street and Main Street, wherein a settings priority may allow for the secondary light to override the primary light during certain circumstances.

In some embodiments, some traffic lights may be a lower priority than others, such as at Baldwin Street and Main Street and Cooke Court and Main Street. The traffic flow at those intersections in a particular direction may be less than surrounding intersections or directions. In some aspects, a light may be responsive to another light, wherein the responsiveness allows for a synchronized flow of traffic within a predefined geographic area. For example, triggering a green light at one light may prompt a subsequent light to turn green after a defined amount of time, such as the time it typically may take a car to move between the intersections.

In some embodiments, traffic flow data for a geographic region may be collected and analyzed, wherein traffic flow patterns and trends may be identified and defined. In some aspects, traffic flow patterns and trends may be known and predictable for a geographic region. As an example, a geographic region may comprise a defined segment of road and any intersecting roads for that stretch. As another example, a geographic region may comprise a grid of intersections. A precision timing mechanism integrated with one or more traffic light or system may allow for the accurate synchronization of traffic lights within a geographic region. In some aspects, traffic flow may be at least partially linked to an event, such as a train crossing, school hours, a bridge going up, as non-limiting examples.

In some aspects, at least a portion of lights within a geographic area may comprise an image capture mechanism. An image capture mechanism may be positioned to collect image data of traffic within the geographic area and at least the traffic proximate to the camera. The image data may be used to adjust priority settings to accommodate for changes in traffic patterns. The adjustment may occur in real time as the image data is captured. The image data may be collected as training data to develop direction for computer vision and artificial intelligence.

In some embodiments, artificial intelligence may be integrated with the traffic light system and analysis of traffic flow data. In some aspects, historical traffic flow data may be used to create predictive algorithms that may govern the traffic light system, such as creating a settings priorities, identifying action conditions, and setting light patterns, as non-limiting examples. In some embodiments, historical data may be combined with third party data, such as from school districts, venues, or transportation schedules.

As an illustrative example, Baldwin Street may be congested every day from 3:15 pm to 4:47 pm, and a green light that lasts for 1.2 minutes every 8 minutes may reduce traffic flow issues. The historical data indicating the hours of congestion may be combined with external data, and it may be determined that the congestion is related to a daily train crossing three intersections from Baldwin Street. The system may allow for predictive synchronization for trains that cross outside of the scheduled times based on the historical data. In some implementations, the traffic light system may be paired with external system that may provide real time data, such as an alert that a train will be crossing in thirty minutes. This may allow for a proactive management of the traffic flow.

Figure 3:
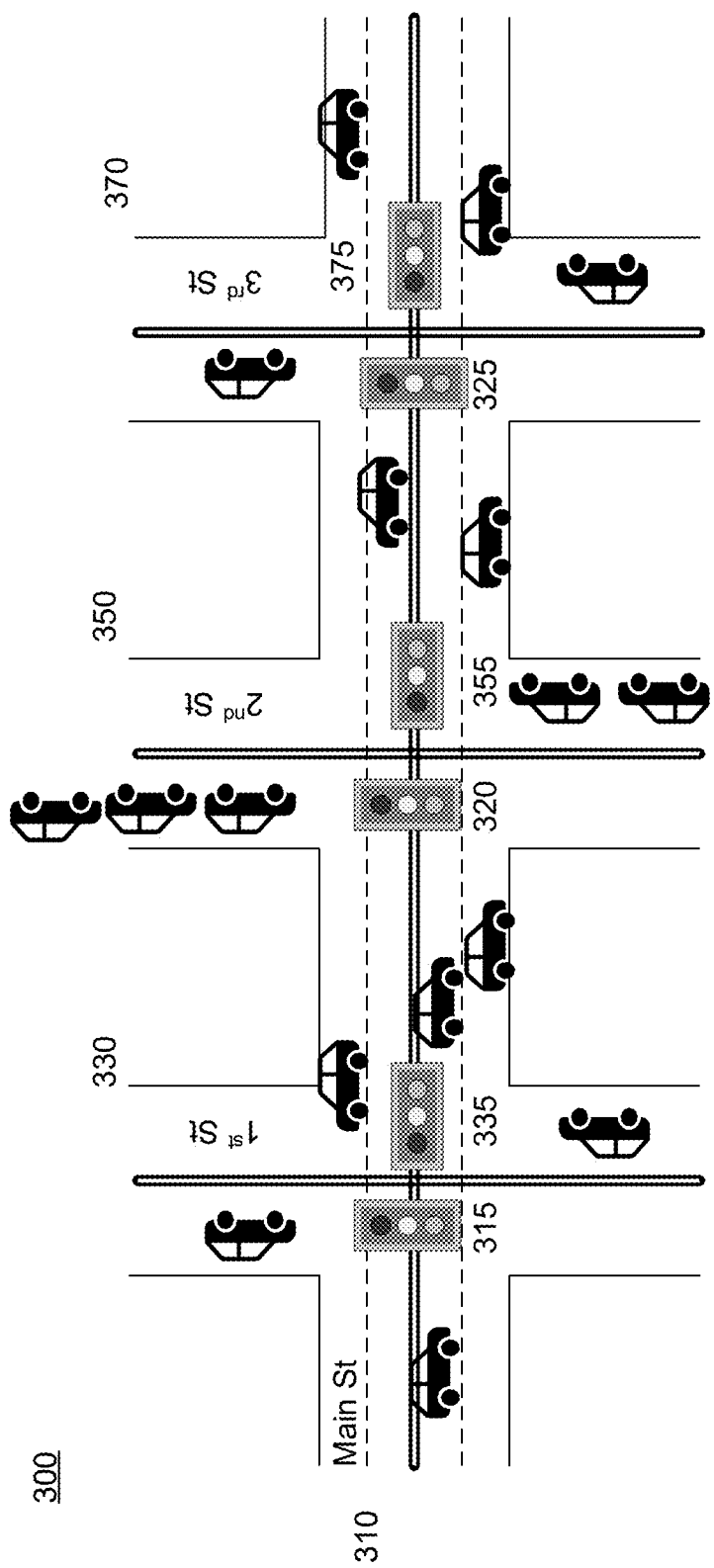
FIG. 3 illustrates an exemplary traffic light system, according to some embodiments of the present disclosure.

Referring now to FIG. 3, an exemplary traffic light system 300 is illustrated. In some aspects, a traffic light system 300 may comprise a main street 310 and a series of crossroads 330, 350, 370, wherein each intersection may comprise a high priority light 315, 320, 325 and a lower priority light 335, 355, 375. In some embodiments, the traffic patterns on the main street 310 may set the base traffic light patterns for the traffic light system 300.

In some aspects, one or more of the traffic lights 315, 320, 325, 335, 355, 375 may comprise a precision timing mechanism, which may allow for precise synchronization between the traffic lights 315, 320, 325, 335, 355, 375. In some aspects, lights may comprise one or more communication mechanisms. In some embodiments, one or more lights in a geographic area may comprise wireless communication mechanisms, wherein the lights may wirelessly communicate with other lights, a traffic management system, or a designated user, as non-limiting examples.

In some implementations, at least a portion of the lights may comprise a wired communication mechanism, which may allow for direct communication without relying on wireless communication. In some embodiments, wireless settings priorities may control when the wireless communication mechanisms function. Wired setting priorities may control if one or more wireless communication mechanism fails.

Depending on how the lights are programmed, failure of a single wireless communication mechanism may trigger a change to a wired setting priority. In some aspects, a wired setting priority may synchronize precision timing mechanisms to allow for efficient flow of traffic based on a predefined set of parameters, such as distance between lights, speed limits, surrounding traffic signs, and road path, as non-limiting examples. In some aspects, when the wireless communication mechanisms become functional, the system may revert back to the wireless priorities settings.

As another example, the traffic lights 315, 320, 325, 335, 355, 375 may comprise a receiver device that may periodically receive timing information from satellite clocks. In some aspects, a portion of the lights 315, 320, 325 may receive timing information more frequently than secondary lights 335, 355, 375. For example, a portion of the lights 315, 320, 325 may receive timing information throughout the day, such as right before a traffic event that may prompt a change in setting priorities or when an action condition may be detected, and all or most of the a portion of the lights 315, 320, 325, 335, 355, 375 may receive timing information during a down moment in the traffic patterns, such as at 3 a.m., which may allow for precision synchronization between the traffic lights 315, 320, 325, 335, 355, 375.

In some implementations, the traffic patterns may be preprogrammed into the traffic light system 300, which may be appropriate where traffic patterns may be predictable. For example, during the weekdays, the main street 310 may have constant traffic for the majority of the day, dense traffic during normal rush hour and lunch times, and sporadic traffic from 10 p.m. to 5 a.m., while during the weekend, the main street 310 may have sporadic traffic for most of the day and dense traffic during brunch times.

In some embodiments, the setting priorities may determine the order of addressing traffic flow. As an illustrative example, Main Street 310 may be the primary road wherein managing traffic flow on Main Street may be prioritized over traffic flow on any of the crossroads 330, 350, 370. After Main Street, $2^{nd}$ Street 350 may frequently become congested, such as because of a nearby business center or shopping center, and a build up of traffic on $2^{nd}$ Street 350 may comprise an action condition that may trigger the $2^{nd}$ Street secondary light 355 to become green, which may affect the $2^{nd}$ Street primary light 320. In some embodiments, a change in traffic light patterns to one primary light 315, 320, 325 may trigger a change to connected primary lights 315, 320, 325.

In continuing the illustrative example, 3rd Street 370 may be connected to a densely populated residential community, and $1^{st}$ Street 330 may lead to a series of sporadic farmland. Accordingly, the traffic flow on $3^{rd}$ Street 370 may be lower priority to $2^{nd}$ Street 350 and higher priority to $1^{st}$ Street. In some aspects, the action conditions of each intersection may be similar or different. For example, the action conditions of each intersection may comprise a predefined threshold traffic congestion level, such as two cars on either side of the crossroad 330, 350, 370 waiting for at least 3 minutes.

As another example, each crossroad 330, 350, 370 may have different action conditions. For example, for $2^{nd}$ Street 350, an action condition may comprise two cars on either side waiting for three minutes; for $3^{rd}$ Street 370, an action condition may comprise four cars on the side of the residential community waiting for two minutes; and for $1^{st}$ Street, an action condition may comprise three cars on both sides waiting for two minutes or five cars on either side waiting for five minutes.

In some embodiments, the action conditions may be periodically adjusted, such as based on seasonal activity or construction. For example, the residential community may be a seasonal community, wherein the majority of residents may live in a different location during certain seasons. Accordingly, one or both the setting priorities may shift and the action conditions may change during the off season. As another example, construction of a shopping plaza off of $1^{st}$ Street 330 may cause a change in setting priorities. In a still further example, ongoing construction in a particular location may comprise an action condition.

In areas that may lack extensive budgets for transportation infrastructure, the traffic light system 300 may be installed on preexisting traffic lights, which may allow for integration of the technology. In some aspects, the traffic light system 300 may pair with existing accessories, such as sensors that may monitor the presence of traffic, which may comprise an action condition. In some embodiments, the traffic light system 300 may be integrated in new traffic light installations, which may allow for more extensive control and options for coordination.

Figure 4:
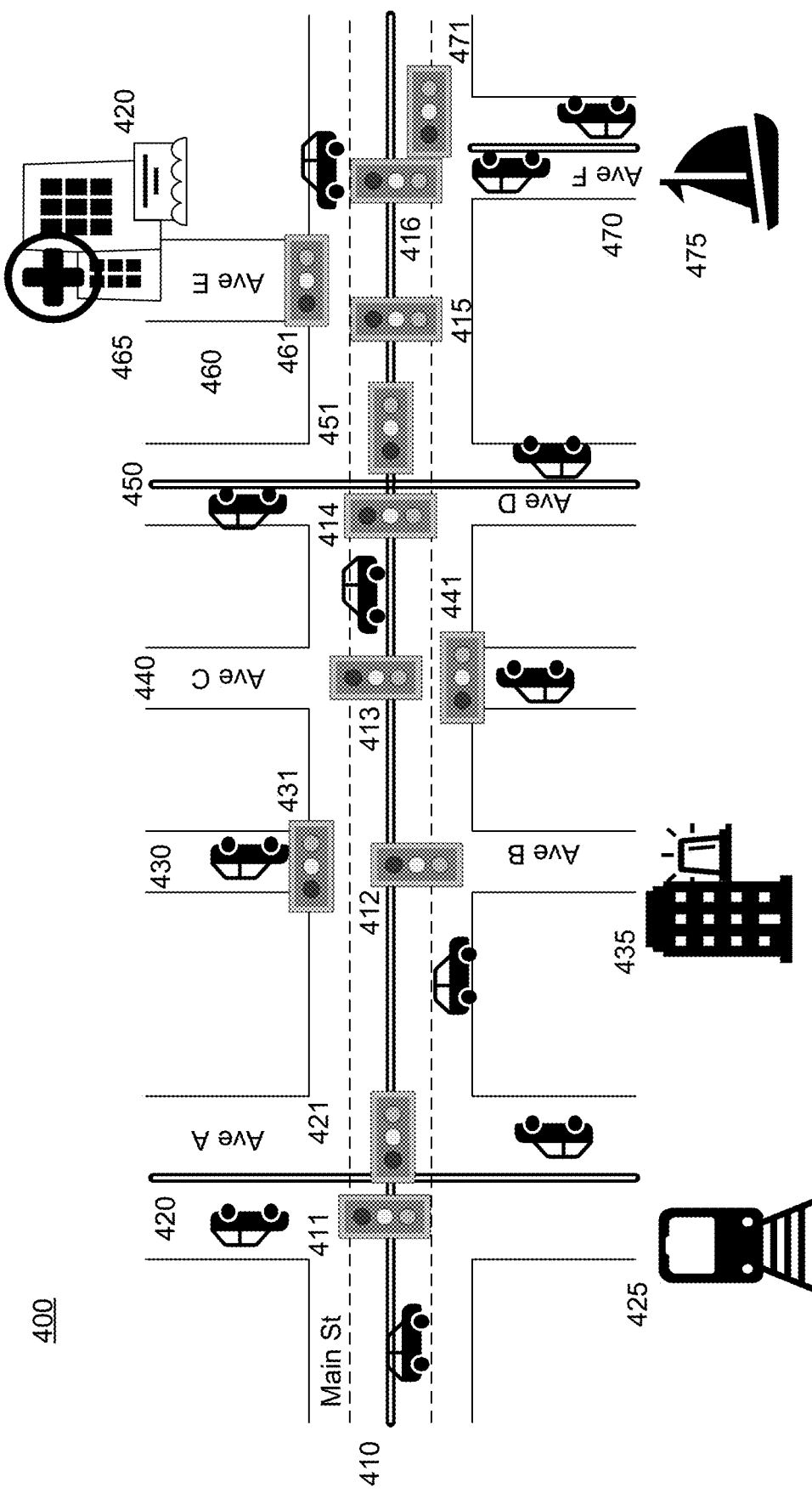
FIG. 4 illustrates an alternate exemplary traffic light system, according to some embodiments of the present disclosure.

Referring now to FIG. 4, an alternate exemplary traffic light system 400 is illustrated. In some aspects, a traffic light system 400 may comprise a main street 410 and a series of crossroads 420, 430, 440, 450, 460, 470, wherein each intersection may comprise a primary light 411-416 and a secondary light 421, 431, 441, 451, 461, 471. As described in FIG. 1, some basic traffic flow patterns may be preprogrammed into the traffic light system 400 based on known or predictable traffic flow patterns, and the priority settings between lights 411-416, 421, 431, 441, 451, 461, 471 may be based on the predictable traffic flow patterns, wherein at least some of the action conditions may be based on traffic congestion.

In some aspects (not shown), an intersection may comprise multiple lights, to wherein within the intersection, there may be a mix of higher and lower priority lights. For example, an intersection may comprise sixteen separate lights, such as those for straight only lanes and turn only lanes. The higher priority lights may comprise those for straight only lanes on the primary road, and the setting priorities may vary between the lower priority lights within the same intersection. For example, the action conditions for the straight only lane lights of the secondary road may rank lower than the action conditions of the turn only lane lights for the primary road.

In some aspects, traffic light systems 400 may be interconnected, such as where a main thoroughfare may extend for long distances over multiple areas, such as cities, towns, counties, and states. In some embodiments, interconnected traffic light systems 400 may have some communication, which may allow for synchronization of some or all of the traffic lights based on setting priorities. For example, three traffic light systems may be linked, wherein each traffic light system has a priority relative to the other traffic light systems and internal priority settings that may govern the infrastructure within the traffic light system 400. Intercommunication may allow for traffic flow management over larger areas. In some implementations, a traffic light system 400 may be managed in isolation from other surrounding traffic light systems, such as where the installation of the traffic light system 400 may be an exception or where the traffic light system 400 may manage a rural area whose traffic may not significantly impact other areas.

In some embodiments, some crossroads 420, 430, 460, 470 may be proximate to sites that may warrant action conditions beyond traffic congestion. For example, train tracks 425 may be located near the intersection of Ave A 420 and Main Street 410, wherein the presence of a train may comprise an action condition. A fire or police station 435 may be located near the intersection of Ave B 430 and Main Street 410, wherein the need for an emergency vehicle to enter the intersection may comprise an action condition. Avenue E 460 may lead directly to a hospital 465, wherein the need for an emergency vehicle to leave or reach the hospital 465 may comprise an action condition, allowing for easy access for emergency vehicles. Avenue F may lead to a waterway 475 with a drawbridge, and the need to raise the drawbridge may comprise an action condition, limiting traffic congestion on Avenue F.

In some aspects, the presence of an emergency vehicle may comprise an action condition, which may prompt a change in the traffic light patterns based on traffic light priorities. In some embodiments, the presence of an emergency vehicle may be detected by local sensors on or near traffic lights 420, 430, 440, 450, 460, 470, 421, 431, 441, 451, 461, 471 programmed to monitor for signals transmitted from emergency vehicles. In some implementations, the presence of an emergency vehicle may be detected by the traffic light system 400 based on an exchange of information with emergency or law enforcement systems, which may track the locations of emergency vehicles or emergency situations, such as accidents, criminal activity, or fires, as non-limiting examples. In some embodiments, pairing the traffic light system 400 with other external systems may allow for increased situational awareness, which may allow for more effective and efficient management of traffic flow without necessarily requiring installation of additional hardware.

Figure 5:
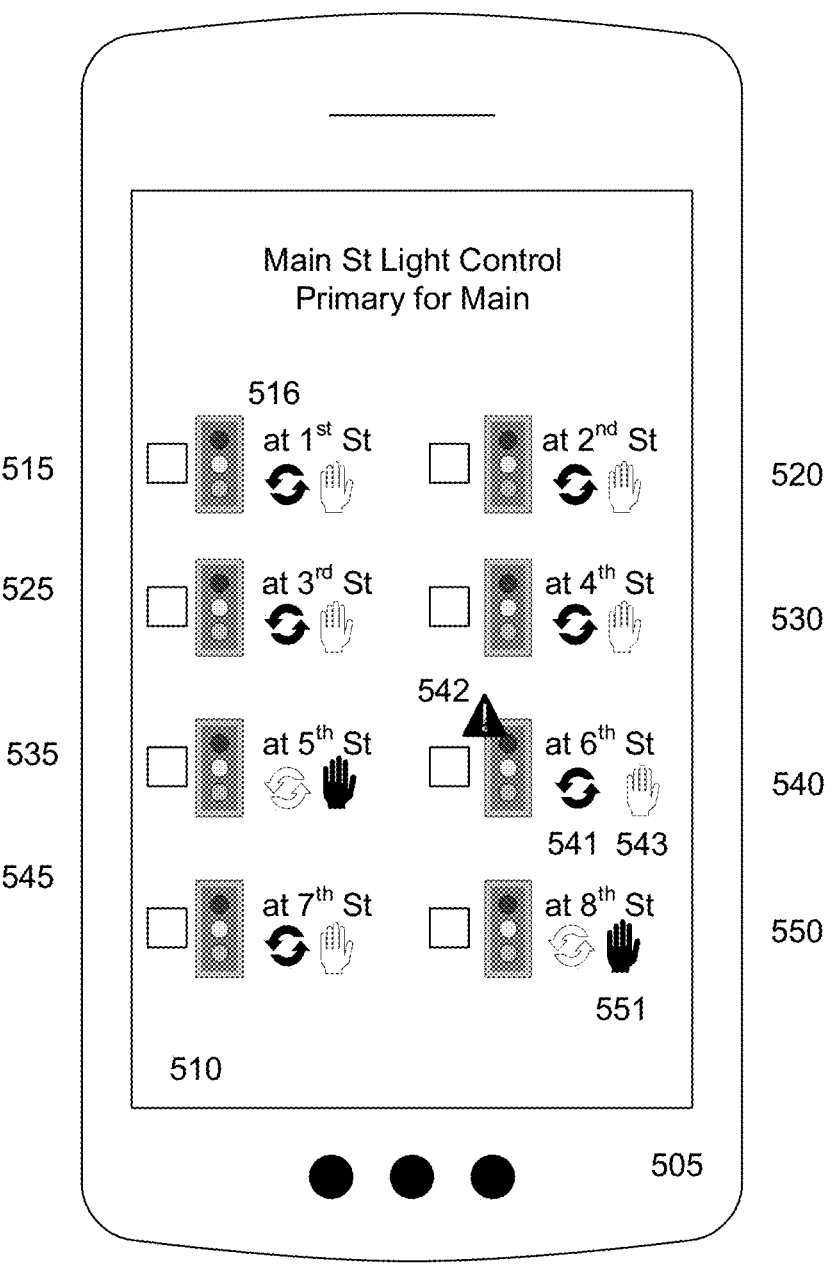
FIG. 5 illustrates an exemplary light graphical user interface (GUI) on a mobile device, wherein lights along Main Street may be controlled and coordinated.

Referring now to FIG. 5, an exemplary light graphical user interface (GUI) 510 is illustrated on a mobile device 505, wherein lights 515, 520, 525, 530, 535, 540, 545, 550 along Main Street may be controlled and coordinated. In some aspects, each of the lights 515, 520, 525, 530, 535, 540, 545, 550 may be controlled manually 551 or through synchronization 516, 541 with other lights. In some embodiments, there may be a mix, wherein some of the lights 515, 520, 525, 530, 535, 540, 545, 550 may be manually controlled and some may operate automatically through synchronization.

For example, at $5^{th}$ Street and Main, there may be a school exit, and during certain hours the primary light 535 may be manually controlled to allow for the school traffic. In some aspects, school traffic may be considered predictable, wherein a manual override may not be necessary and the traffic pattern may be preprogrammed into the traffic light system In some aspects, traffic patterns may be less predictable. For example, at $6^{th}$ Street and Main Street, there may be a concert hall, which may periodically host shows and events. In some implementations, a user may receive an alert 542 when a manual override may be preferable. In some embodiments, such as where at least a portion of the intersections may be paired with traffic sensors, an alert 542 may be triggered when significant traffic congestion may be detected. In some aspects, such as where predefined third parties may be able to send notifications of action conditions, a third party may send an alert 542. For example, designated personnel from the concert hall may be able to notify the traffic light system when an event is taking place.

In some implementations, an alert 542 may be received in real time when the need for a manual override may be occurring. In some aspects, an alert 542 may be received in anticipation for a need for manual override. In some embodiments, alerts 542 may be received in anticipation and in real time, which may allow for the greatest flexibility.

For example, on Wednesday, designated personnel may send an alert 542 that a concert will be happening from 8 p.m. to 11 p.m. on Thursday, which may allow a user to toggle the primary light 540 for that intersection from synchronization 541 to manual override 543 for that time period. As another example, an accident may occur at the intersection, and an emergency response vehicle may respond to the accident. The presence of the emergency response vehicle in proximity of the intersection may trigger an alert for a manual override to adjust for the traffic congestion that may be caused by the accident.

Figure 6:
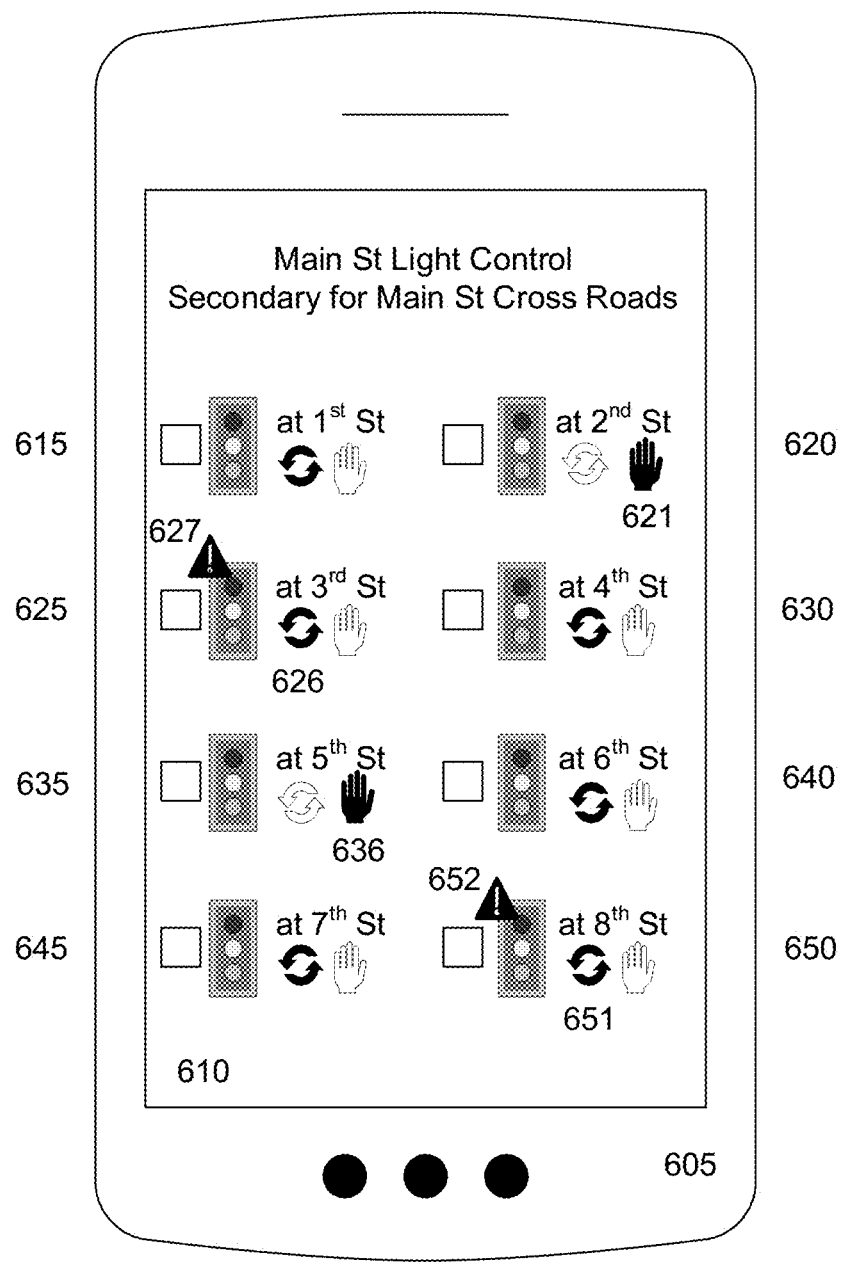
FIG. 6 illustrates an exemplary light GUI on a mobile device, wherein lights along crossroads of Main Street may be controlled and coordinated.

Referring now to FIG. 6, an exemplary light GUI 610 is illustrated on a mobile device 605, wherein lights 615, 620, 625, 630, 635, 640, 645, 650 for crossroads along Main Street may be controlled and coordinated. In some aspects, each of the lights 615, 620, 625, 630, 635, 640, 645, 650 may be controlled manually 621, 636 or through synchronization 626, 651 with other lights. In some aspects, a user may toggle between multiple light GUIs 610, such as illustrated in FIG. 5, which may allow a user to effectively control and coordinate a traffic light system. In some aspects, users may access the light GUI 610 through mobile devices, such as a tablet, laptop, or smartphone, or a desktop device, such as a desktop computer.

In some aspects, manual override of a light at an intersection may allow or require a manual override 636 of a proximate light 635 in the same intersection. In some embodiments, manual override of a first light may prevent a manual override of a second light, which may limit the ability to create conflicting setting priorities. In some embodiments, a light GUI 610 may indicate alerts 627, 652, which may notify a user of predefined circumstances, such as action conditions, manual override of a corresponding primary light in an intersection, or a traffic light error, as non-limiting examples.

For example, the primary light at $6^{th}$ Street and Main Street may be under manual control, such as in response to an accident, and an alert status may be associated with the light 650 at $6^{th}$ Street and Main Street to indicate that a manual override of light 650 may be prohibited at the time. As another example, the electricity at the light 625 for 3rd Street and Main Street may have gone out, and an alert 627 may prompt a user to send maintenance. The alert 627 may also prompt an override of a light at the same intersection or of nearby traffic lights, as a way to mitigate traffic issues that may arise due to the outage.

In some aspects, a manual override 621, 636 may indicate that an action condition is occurring and the setting priorities may have allowed the traffic needs of lights 620, 635 in those intersections to override the nearby lights. In some embodiments, a manual override 621, 636 may indicate that a user may be manually controlling the secondary light 620, 635, such as when a malfunction may occur or a need for an emergency vehicle to pass through the intersection.

In some embodiments, a user may comprise designated individuals that may be allowed to view or manage a traffic light system. In some aspects, users may comprise designated individuals within government agencies associated with traffic control, such as the Department of Transportation. In some implementations, users may comprise designated individuals within emergency or law enforcement who may need limited access to override the traffic light system. In some embodiments, users may have limited access, such as the limited ability to only view or to send alerts regarding action conditions. In some aspects, such as described in FIGS. 4 and 5, users may comprise designated third parties who may be associated with action conditions, such as event venues or drawbridge attendants.

Figure 7:
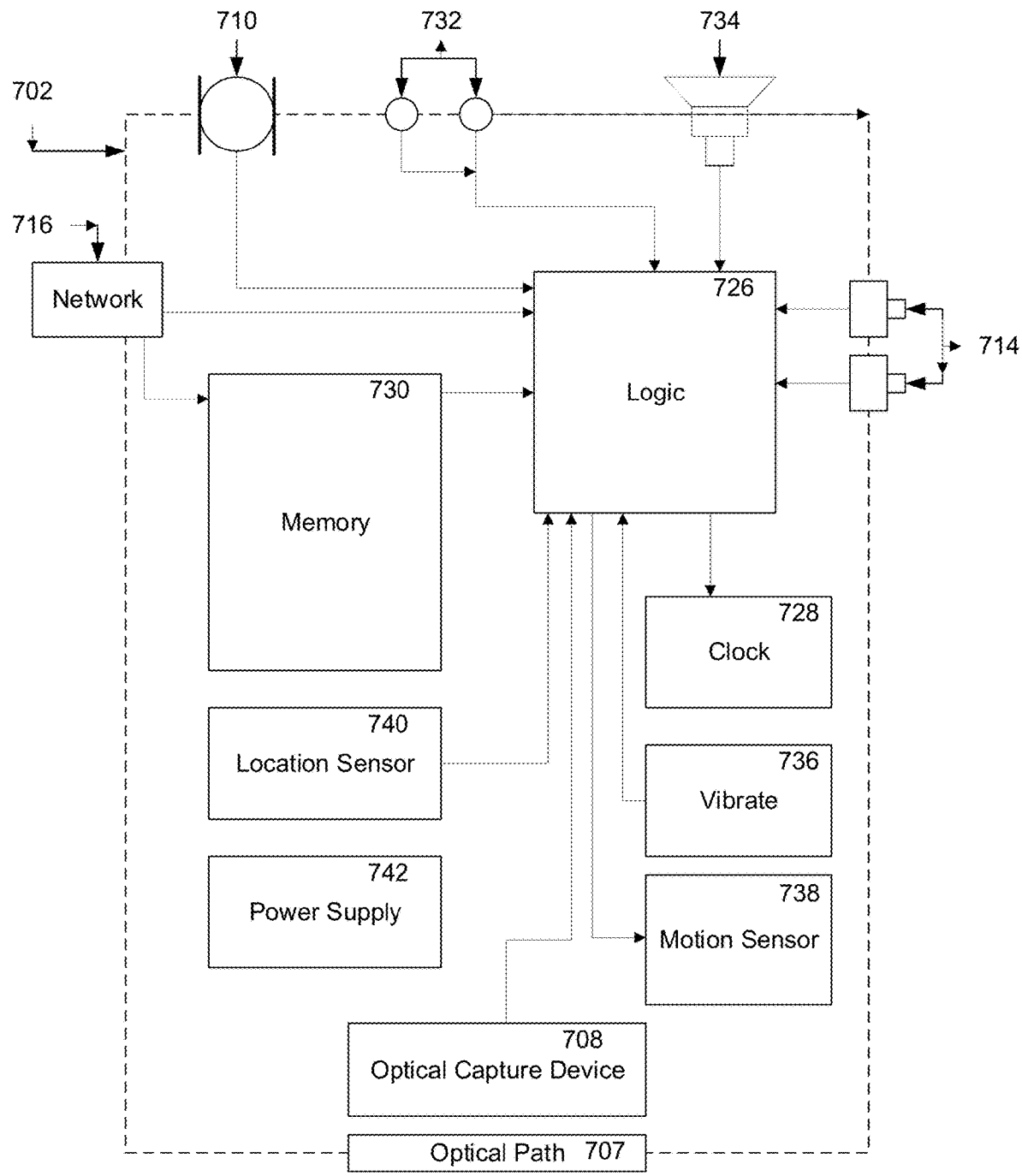
FIG. 7 illustrates an exemplary block diagram of an exemplary embodiment of a mobile device, according to some embodiments of the present disclosure.

Referring now to FIG. 7, an exemplary block diagram of an exemplary embodiment of a mobile device 702 is illustrated. The mobile device 702 may comprise an optical capture device 708, which may capture an image and convert it to machine-compatible data, and an optical path 706, typically a lens, an aperture, or an image conduit to convey the image from the rendered document to the optical capture device 708. The optical capture device 708 may incorporate a Charge-Coupled Device (CCD), a Complementary Metal Oxide Semiconductor (CMOS) imaging device, or an optical sensor of another type.

In some embodiments, the mobile device 702 may comprise a microphone 710, wherein the microphone 710 and associated circuitry may convert the sound of the environment, including spoken words, into machine-compatible signals. Input facilities 714 may exist in the form of buttons, scroll-wheels, or other tactile sensors such as touch-pads. In some embodiments, input facilities 714 may include a touchscreen display. Visual feedback 732 to the user may occur through a visual display, touchscreen display, or indicator lights. Audible feedback 734 may be transmitted through a loudspeaker or other audio transducer. Tactile feedback may be provided through a vibration module 736.

In some aspects, the mobile device 702 may comprise a motion sensor 738, wherein the motion sensor 738 and associated circuitry may convert the motion of the mobile device 702 into machine-compatible signals. For example, the motion sensor 738 may comprise an accelerometer, which may be used to sense measurable physical acceleration, orientation, vibration, and other movements. In some embodiments, the motion sensor 738 may comprise a gyroscope or other device to sense different motions.

In some implementations, the mobile device 702 may comprise a location sensor 740, wherein the location sensor 740 and associated circuitry may be used to determine the location of the device. The location sensor 740 may detect Global Position System (GPS) radio signals from satellites or may also use assisted GPS where the mobile device may use a cellular network to decrease the time necessary to determine location. In some embodiments, the location sensor 740 may use radio waves to determine the distance from known radio sources such as cellular towers to determine the location of the mobile device 702. In some embodiments these radio signals may be used in addition to and/or in conjunction with GPS.

In some aspects, the mobile device 702 may comprise a logic module 726, which may place the components of the mobile device 702 into electrical and logical communication. The electrical and logical communication may allow the components to interact. Accordingly, in some embodiments, the received signals from the components may be processed into different formats and/or interpretations to allow for the logical communication. The logic module 726 may be operable to read and write data and program instructions stored in associated storage 730, such as RAM, ROM, flash, or other suitable memory. In some aspects, the logic module 726 may read a time signal from the clock unit 728. In some embodiments, the mobile device 702 may comprise an on-board power supply 732. In some embodiments, the mobile device 702 may be powered from a tethered connection to another device, such as a Universal Serial Bus (USB) connection.

In some implementations, the mobile device 702 may comprise a network interface 716, which may allow the mobile device 702 to communicate and/or receive data to a network and/or an associated computing device. The network interface 716 may provide two-way data communication. For example, the network interface 716 may operate according to an internet protocol. As another example, the network interface 716 may comprise a local area network (LAN) card, which may allow a data communication connection to a compatible LAN. As another example, the network interface 716 may comprise a cellular antenna and associated circuitry, which may allow the mobile device to communicate over standard wireless data communication networks. In some implementations, the network interface 716 may comprise a Universal Serial Bus (USB) to supply power or transmit data. In some embodiments, other wireless links known to those skilled in the art may also be implemented.

Figure 8:
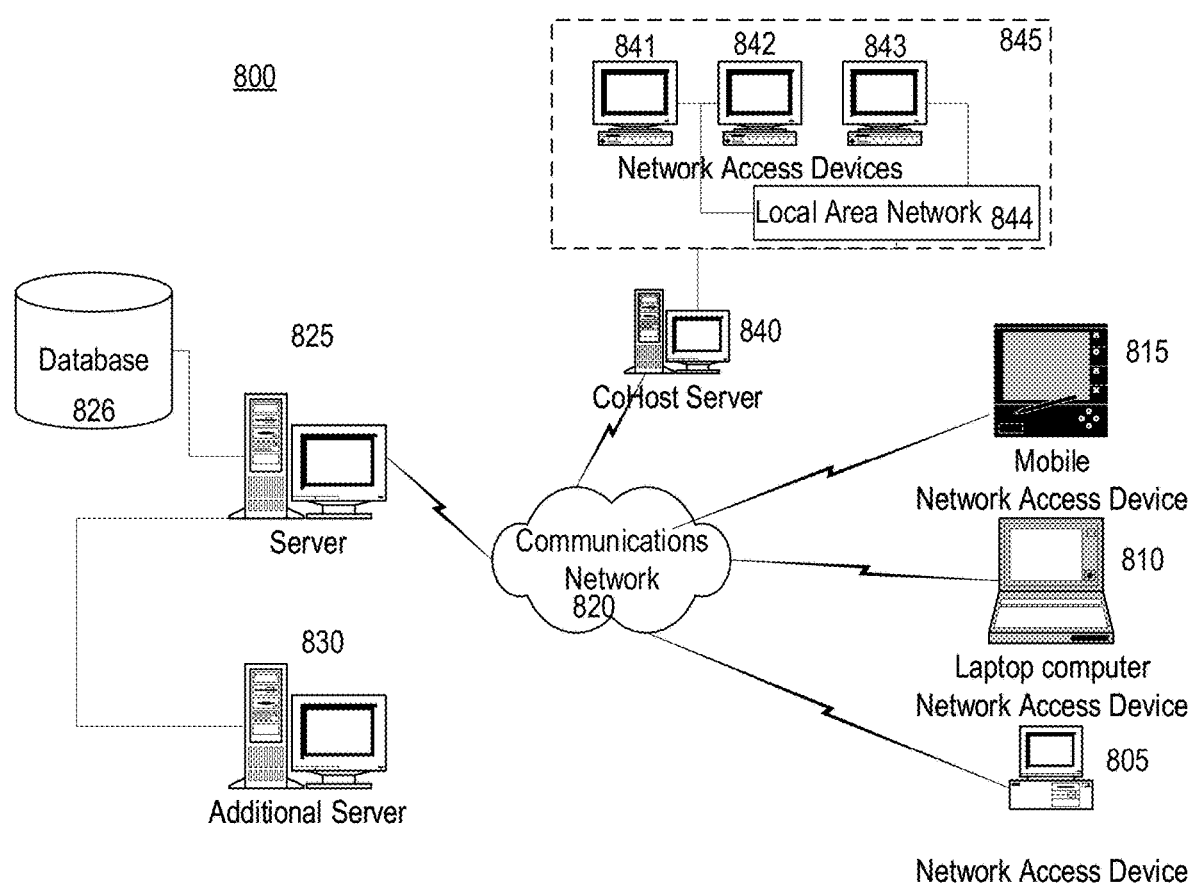
FIG. 8 illustrates apparatus that may be used to implement aspects of the present disclosure, including executable software.

Referring now to FIG. 8, an exemplary processing and interface system 800 is illustrated. In some aspects, access devices 815, 810, 805, such as a paired portable device 815 or laptop computer 810 may be able to communicate with an external server 825 though a communications network 820. The external server 825 may be in logical communication with a database 826, which may comprise data related to identification information and associated profile information. In some embodiments, the server 825 may be in logical communication with an additional server 830, which may comprise supplemental processing capabilities.

In some aspects, the server 825 and access devices 805, 810, 815 may be able to communicate with a cohost server 840 through a communications network 820. The cohost server 840 may be in logical communication with an internal network 845 comprising network access devices 841, 842, 843 and a local area network 844. For example, the cohost server 840 may comprise a payment service, such as PayPal or a social network, such as Facebook or a dating website.

Figure 9:
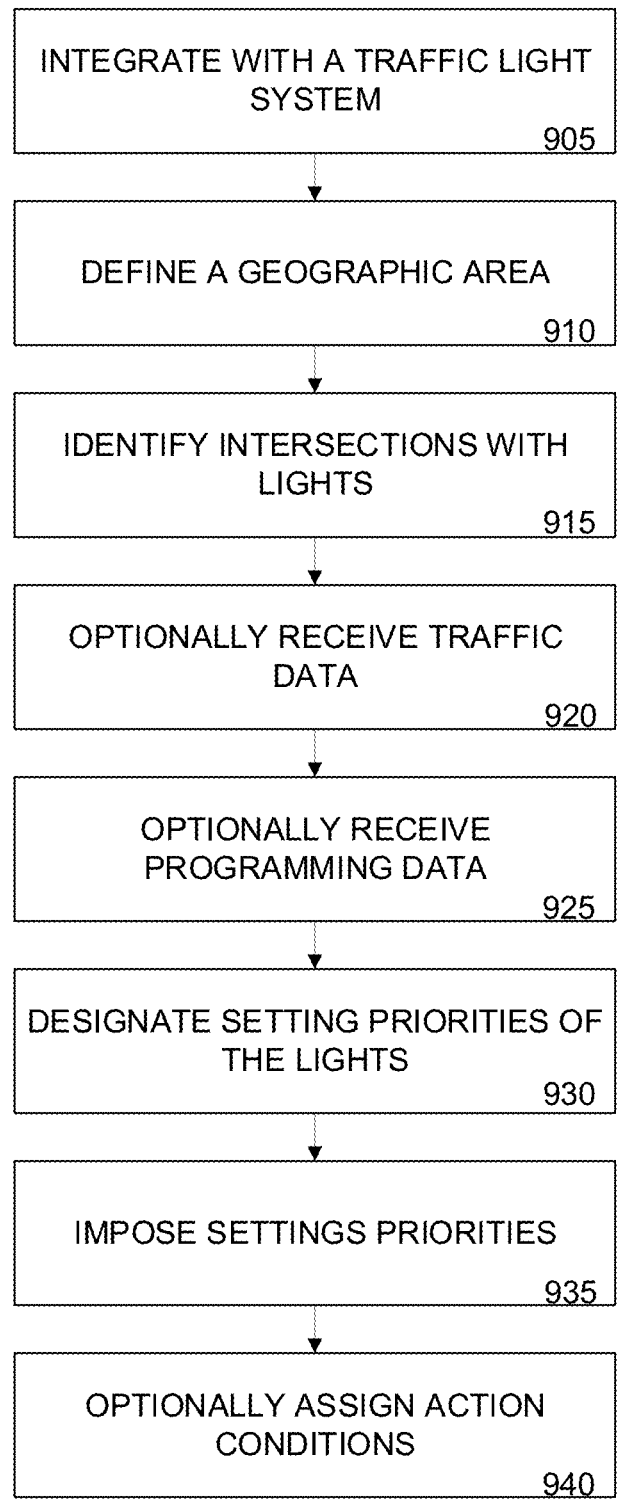
FIG. 9 illustrates exemplary method steps for controlling a traffic light system, according to some embodiments of the present disclosure.

Referring now to FIG. 9, exemplary method steps for controlling a traffic light system is illustrated. At 905, a controlling device may be integrated with a traffic light system. At 910, a geographic area of traffic may be defined. At 915, intersections with traffic lights may be identified. In some aspects, at 920, traffic data may be received. In some embodiments, at 925, programming data may be received. In some implementations, the system may be remotely programmed, such as through an external device as illustrated in FIGS. 5-6. At 930, light priority may be designated. At 935, setting priorities between lights may be imposed. In some aspects, at 940, action conditions may be assigned to one or more traffic light.

Figure 10:
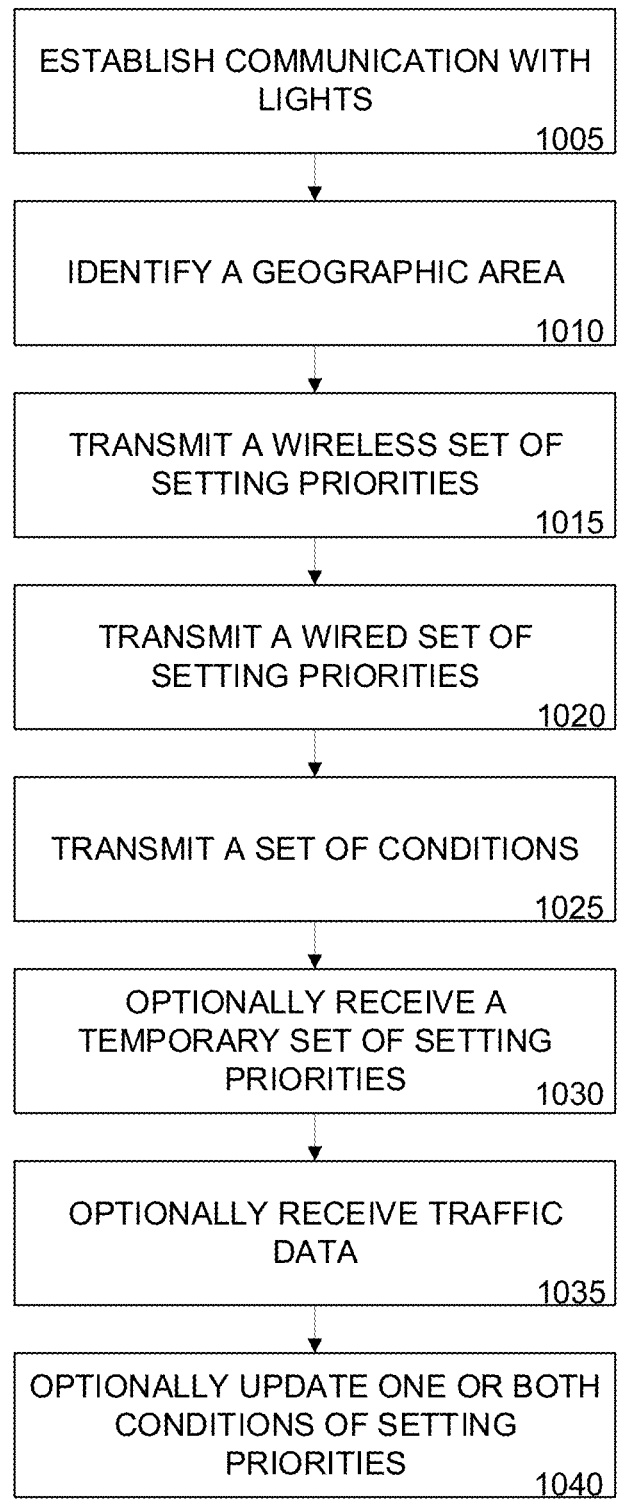
FIG. 10 illustrates exemplary method steps for controlling a traffic light system, according to some embodiments of the present disclosure.

Referring now to FIG. 10, exemplary method steps for controlling a traffic light system is illustrated. At 1005, communication with a lights within a predefined geographic area may be established. At 1010, a geographic area may be identified. At 1015, wireless set of setting priorities may be transmitted. At 1020, a wired set of setting priorities may be transmitted. At 1925, a set of action conditions may be set. In some aspects, at 1030, a temporary set of setting priorities may be received. In some embodiments, traffic data may be received. In some implementations, at 1040, setting priorities may be updated based on the received action conditions.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A traffic light system for managing traffic flow, the traffic light system comprising: a first light comprising: a first traffic light, a first wireless communication mechanism, a first wired communication mechanism, and a first precision timing mechanism, wherein the first light is located at a first intersection within a predefined geography, wherein timing associated with the first light is based on a first set of predefined parameters; a second light comprising: a second traffic light, a second wireless communication mechanism, a second wired communication mechanism, and a second precision timing mechanism, wherein the second light is located at a second intersection within the predefined geography, wherein timing associated with the second light is based on a second set of predefined parameters; a first wireless set of setting priorities that prioritizes the first set of predefined parameters and the second set of predefined parameters, wherein the first set of setting priorities determine a first order of priority of responsiveness between the first light and the second light, and wherein the first set of setting priorities are communicated wirelessly to the first wireless communication mechanism and the second wireless communication mechanism; and a first wired set of setting priorities prioritizes the first set of predefined parameters and the second set of predefined parameters, wherein the first wired set of setting priorities determine a second order of priority of responsiveness between the first light and the second light, and wherein the first wired set of setting priorities controls the first light if the first wireless communication mechanism fails and the first wired set of setting priorities controls the second light if the second wireless communication mechanism fails;

wherein a second wireless set of setting priorities that prioritizes the first set of predefined parameters and the second set of predefined parameters, wherein the second wireless set of setting priorities override the first wireless set of setting priorities when the second wireless set of setting priorities is initiated.

2. The system of claim 1, wherein the second wireless set of setting priorities is customizable when initiated.

3. The system of claim 2, wherein the second wireless set of setting priorities is temporary.

4. The system of claim 1, wherein the first wired set of setting priorities controls when either the first wireless communication mechanism fails or the second wireless communication mechanism fails.

5. The system of claim 1, wherein the traffic light system reverts back to the first wireless set of setting priorities when one or both the first wireless communication mechanism or the second wireless communication mechanism is available.

6. A traffic light system for managing traffic flow, the traffic light system comprising: a plurality of lights, each comprising: a traffic light, a wireless communication mechanism, a wired communication mechanism, and a precision timing mechanism, wherein the plurality of lights are located at a plurality of intersections within a predefined geography, wherein timing associated with each light is based on a set of predefined parameters; a first wireless set of setting priorities that prioritizes the set of predefined parameters through wireless communication with at least a portion of the wireless communication mechanisms; and a first wired set of setting priorities that prioritizes the set of predefined parameters through wired communication with at least a portion of the wired communication mechanisms, wherein the first wired set of setting priorities controls when there is a loss in communication with at least a portion of the wireless communication mechanisms;

wherein a temporary wireless set of setting priorities that overrides the first wireless set of setting priorities;

wherein the temporary wireless set of setting priorities is customizable; and wherein customization is received through wireless communication with a wireless device within a predefined range of the traffic light system.

7. The traffic light system of claim 6, wherein the temporary wireless set of setting priorities controls a portion of the plurality of lights, and wherein the first wireless set of setting priorities controls a remaining portion of the plurality of lights.

8. The traffic light system of claim 6, wherein at least a portion of the plurality of lights further comprises a camera that collects periodic imagery of at least a portion of the plurality of intersections.

9. The traffic light system of claim 8, wherein periodic imagery is analyzed for changes in traffic patterns associated with at least the portion of the plurality of intersections.

10. The traffic light system of claim 9, wherein analysis occurs in real time, and changes prompt initiation of the temporary wireless set of setting priorities, wherein the temporary wireless set of setting priorities is based at least in part on the changes.

11. The traffic light system of claim 9, wherein the periodic imagery is collected to build a set of training data for development of a dynamic algorithm based on analysis of the set of training data, wherein the dynamic algorithm is configured to update one or both the first wireless set of setting priorities and the first wired set of setting priorities, wherein updates are based on analysis.

12. A method for managing traffic flow, the method comprising: establishing communication with a plurality of lights, wherein each of the plurality of lights comprise: a traffic light, a wireless communication mechanism, a wired communication mechanism, and a precision timing mechanism, wherein the plurality of lights are located at a plurality of intersections within a predefined geography, wherein timing associated with each light is based on a set of predefined parameters; transmitting a first set of setting priorities to at least a first portion of wireless communication mechanisms that prioritize the set of predefined parameters; transmitting a second set of setting priorities to at least a second portion of wired communication mechanisms that prioritize the set of predefined parameters; and transmitting a set of conditions that determine when the first set of setting priorities controls and when the second set of setting priorities controls;

wherein receiving a temporary set of setting priorities and transmitting the temporary set of setting priorities, wherein the temporary set of setting priorities temporarily override the first set of setting priorities and the second set of setting priorities.

13. The method of claim 12, further comprising receiving traffic data about at least a portion of the plurality of intersections, and updating one or more the first set of setting priorities, the second set of setting priorities, and the set of conditions based on the traffic data.

14. The method of claim 13, wherein updating occurs in real time.

15. The method of claim 13, wherein at least a portion of traffic data comprises image data.

* * * * *